(12) United States Patent
Joko

(10) Patent No.: US 8,374,615 B2
(45) Date of Patent: Feb. 12, 2013

(54) LARGE CELL BASE STATION AND COMMUNICATION CONTROL METHOD

(75) Inventor: Shingo Joko, Kanagawa (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 13/504,889

(22) PCT Filed: Oct. 28, 2010

(86) PCT No.: PCT/JP2010/069129
§ 371 (c)(1),
(2), (4) Date: Apr. 27, 2012

(87) PCT Pub. No.: WO2011/052665
PCT Pub. Date: May 5, 2011

(65) Prior Publication Data
US 2012/0214496 A1  Aug. 23, 2012

(30) Foreign Application Priority Data
Oct. 29, 2009  (JP) .................................. 2009-249466

(51) Int. Cl.
*H04W 40/00* (2009.01)
(52) U.S. Cl. .......................... 455/448; 455/444; 455/450
(58) Field of Classification Search .................. 455/448, 455/444, 450
See application file for complete search history.

(56) References Cited

U.S. PATENT DOCUMENTS

| 2011/0201367 | A1* | 8/2011 | Aminaka et al. ............. 455/501 |
| 2012/0213188 | A1* | 8/2012 | Joko ............................. 370/329 |
| 2012/0214498 | A1* | 8/2012 | Joko ............................. 455/449 |

FOREIGN PATENT DOCUMENTS

| JP | 07-203518 A | 8/1995 |
| JP | 2008-061250 A | 3/2008 |

OTHER PUBLICATIONS

TSG-RAN Working Group 4 (Radio) meeting #52; NTT DOCOMO; "Downlink Interference Coordination Between eNodeB and Home eNodeB"; R4-093244; Shenzhen; Aug. 24-28, 2009.
TSB-RAN Working Group 4 (Radio) meeting #52bis; KYOCERA; "Network Assisted Interference Coordination between Macro eNodeB and Home eNodeB in Downlink"; R4-093620; Miyazaki, Japan; Oct. 12-16, 2009.

* cited by examiner

*Primary Examiner* — Barry Taylor
(74) *Attorney, Agent, or Firm* — Studebaker & Brackett PC; Tim L. Brackett, Jr.

(57) ABSTRACT

When a radio terminal (200) receives interference from a small-cell base station (300), a large-cell base station (100) sends, to the small-cell base station (300), band use restriction information indicating a band with restricted use which is a frequency band, in which the use thereof needs to be restricted by the small-cell base station (300). In this instance, the large-cell base station (100) sets the upper and lower limit for the band with restricted use so that the upper and lower limit thereof match the limit of an S-CQI measured unit band.

3 Claims, 6 Drawing Sheets

FIG. 3
(a)
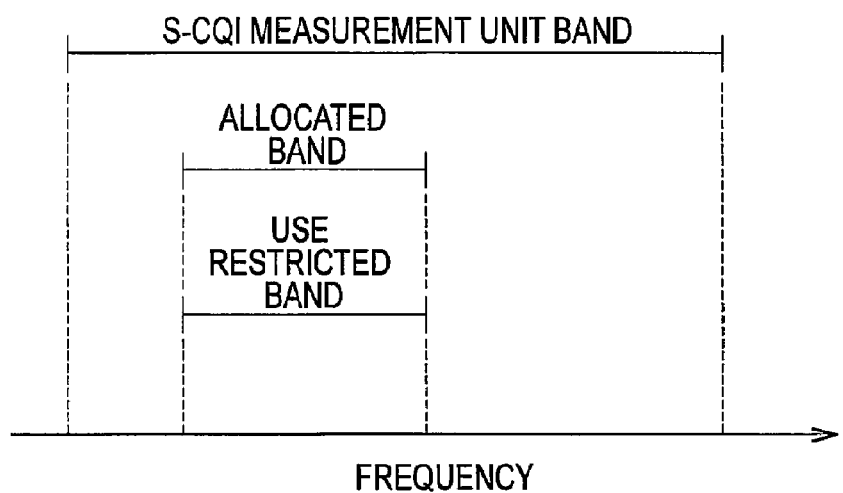
(b)
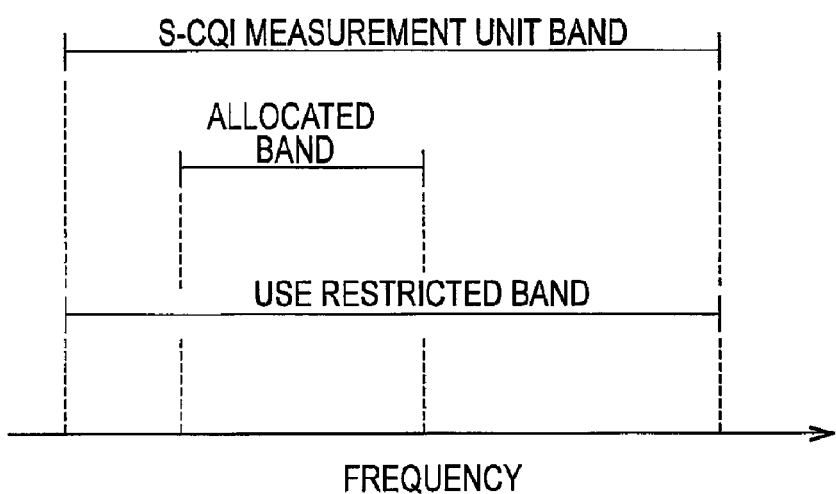

LARGE CELL BASE STATION AND COMMUNICATION CONTROL METHOD

TECHNICAL FIELD

The present invention relates to a large cell base station to which a radio terminal is connected, the large cell base station configured to form a large cell in which a small cell base station configured to form a small cell smaller than the large cell is installed, and to a communication control method in the large cell base station.

BACKGROUND ART

An LTE standardized by 3GPP that is a standard-setting organization for a mobile communication system is a next generation radio communication system that achieves communications with a higher speed and a larger capacity compared with currently operated 3rd and 3.5th generation radio communication systems. Technical specifications of the LTE have been determined with a 3GPP Release 8. Recently, a Release 9 that is a function improved version of the Release 8 and an LTE Advanced that is an upgraded version of the LTE have been studied.

In the LTE Release 9, standardization of detail functions and requirements of a small cell base station (Home eNodeB) are under development. The small cell base station is a small base station capable of being installed in a room and is configured to form a cell (referred to as small cell) which is a communication area having a radius of several to several tens of meters. The small cell base station is installed to disperse the traffic of a large cell base station (Macro eNodeB) configured to form a large cell which is a communication area having a radius of about several hundreds of meters and to cover a dead area in the large cell.

In such a radio communication system, interference may occur in radio communications of a radio terminal connected to the large cell base station due to radio communications of the small cell base station in the following case. Specifically, this occurs when a frequency band of a resource block that is a radio resource capable of being allocated to the radio terminal in the large cell base station partly or completely overlaps with a frequency band of a resource block that is a radio resource capable of being allocated to another radio terminal in the small cell base station. To avoid the interference, for example, Non-Patent Document 1 proposes a technique in which an interface is established between the large cell base station and the small cell base station, and a resource block to be allocated (used) by the small cell base station is restricted by the large cell base station through transmitting a predetermined message to the small cell base station.

PRIOR ART DOCUMENTS

Non-Patent Documents

NON-PATENT DOCUMENT 1: R4-093244, "Downlink Interference Coordination Between eNodeB and Home eNodeB," NTT DOCOMO

SUMMARY OF THE INVENTION

In the above-described conventional technique, the large cell base station determines whether the radio terminal is receiving the interference from the small cell base station on the basis of an RSRP from the radio terminal, and determines a channel condition on the basis of a CQI from the radio terminal. If the CQI is a value representing a communication quality in multiple resource blocks such as an average value of the CQIs of the respective resource blocks for example, the following problem occurs.

Specifically, when the frequency band for the CQI does not match the frequency band under restriction of use by the small cell base station, the frequency band for the resource block under the restriction of use by the small cell base station may only partially overlap with the frequency band for the CQI. When the use of the resource block is restricted in the small cell base station in such a state, the CQI in the frequency band for the CQI covers a band where the interference is received and a band where the interference is not received, and thereby is lower than that the CQI covering only bands where the interference is not received. Thus, even when only the resource block at the frequency band under the restriction of use is allocated to the radio terminal, the corresponding CQI is so low that the modulation scheme is degraded more than necessary. Thus, degradation of a transmission efficiency, in other words, degradation of a use efficiency of the resource block may occur.

Thus, an objective of the present invention is to provide a large cell base station and a communication control method that can appropriately reduce interference from a small cell base station to a radio terminal connected to the large cell base station while preventing degradation of a use efficiency of a radio resource.

The present invention has the following features to solve the problems described above. A first feature of a radio communication system according to the present invention is summarized as follows. A large cell base station (large cell base station 100) to which a radio terminal is connected, the large cell base station configured to form a large cell (MC1) in which a small cell base station (small cell base stations 300a, 300b) configured to form a small cell (FC1, FC2) smaller than the large cell is installed, comprises: a determination unit (determination unit 122) configured to determine a radio resource to be allocated to the radio terminal, the radio resource determined by the determination unit having a frequency band narrower than a measurement unit band that is a frequency band for a measurement unit of a communication quality in the radio terminal; and a band use restriction information transmitter (band use restriction information transmitter 124) configured to, when the radio terminal is receiving interference from the small cell base station, select the measurement unit band including the frequency band of the radio resource determined by the determination unit from the measurement unit bands, and transmit band use restriction information indicating that the selected measurement unit band is a use restricted band that is a frequency band needing restriction of use by the small cell base station to the small cell base station.

Such a large cell base station transmits the band use restriction information indicating the use restricted band that is a frequency band needing restriction of use by the small cell base station, when the radio terminal is receiving the interference from the small cell base station. Here, the large cell base station sets the use restricted band to be equal to or larger than the measurement unit band that is a frequency band for a measurement unit of the communication quality in the radio terminal and sets the upper limit and the lower limit of the use restricted band to match the boundaries of the measurement unit band. Thus, the use of the entire measurement unit band is restricted. Thus, the communication quality is even across the entire measurement unit band. Accordingly, when the radio resource at the frequency band under the restriction of use is allocated to the radio terminal, the communication quality of the allocated frequency band is not estimated to be lower than the original one. Therefore, the modulation scheme is not degraded more than necessary to reduce the use efficiency of the radio resource as in the conventional case.

A second feature of a radio communication system according to the present invention is summarized as follows. The band use restriction information transmitter changes the use restricted band when the measurement unit band changes.

A third feature of a radio communication system according to the present invention is summarized as follows. A communication control method in a large cell base station to which a radio terminal is connected, the large cell base station configured to form a large cell in which a small cell base station configured to form a small cell smaller than the large cell is installed, comprises the steps of: determining, at the large cell base station, a radio resource to be allocated to the radio terminal, the determined radio resource having a frequency band narrower than a measurement unit band that is a frequency band for a measurement unit of a communication quality in the radio terminal; and when the radio terminal is receiving interference from the small cell base station, selecting, at the radio base station, the measurement unit band including the frequency band of the radio resource determined by the determination unit from the measurement unit bands, and transmitting band use restriction information indicating that the selected measurement unit band is a use restricted band that is a frequency band needing restriction of use by the small cell base station to the small cell base station.

According to the present invention, interference from a small cell base station to a radio terminal connected to a large cell base station can be appropriately reduced while degradation of a use efficiency of a radio resource is prevented.

BRIEF DESCRIPTION OF THE DRAWINGS

FIG. 3 is a diagram showing relationships between an S-CQI measurement unit band and a use restricted band according to the embodiment of the present invention.

DESCRIPTION OF THE EMBODIMENTS

Next, an embodiment of the present invention will be described with reference to the drawings. Specifically, a description is given on (1) Configuration of Radio Communication System, (2) Operation of Radio Communication System, (3) Advantageous Effects, and (4) Other Embodiments. In the description of the drawings of the embodiment below, same or similar reference signs denote same or similar elements and portions.

Figure 1:
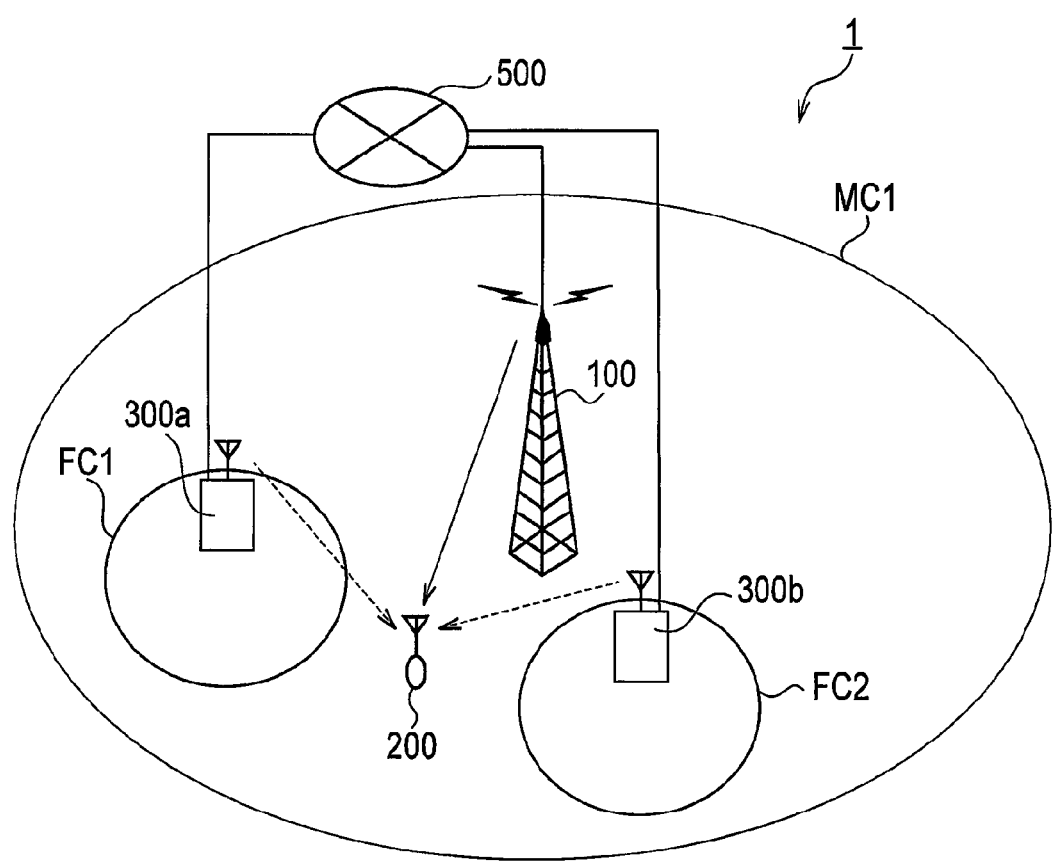
FIG. 1 is an overall schematic configuration view of a radio communication system according to an embodiment of the present invention.

(1) Configuration of Radio Communication System (1.1) Overall Schematic Configuration of Radio Communication System FIG. 1 is an overall schematic configuration view of a radio communication system 1 according to an embodiment of the present invention. The radio communication system 1 has a configuration based on an LTE 9 that is a 3.9th Release generation (3.9G) cell-phone system or an LTE-Advanced regarded as a 4th generation (4G) cell-phone system.

As shown in FIG. 1, the radio communication system 1 includes a large cell base station (e.g., macrocell base station) 100 configured to form a large cell (e.g., macrocell) MC1 as a radio wave range and small base stations (e.g., femtocell base station) 300a and 300b configured to form small cells (e.g., femtocell) FC1 and FC2 as radio wave ranges, respectively. The large cell MC1 has a radius of about several hundreds of meters for example, and the small cells FC1 and FC2 each have a radius of about several to several tens of meters for example. A radio terminal 200 is connected to the large cell base station 100.

In the description given below, when the small cells FC1 and FC2 are not distinguished from each other, the cells are simply referred to as "small cell FC". When the small cell base stations 300a and 300b are not distinguished from each other, the base stations are simply referred to as "small cell base station 300".

The large cell base station 100 is installed at a portion based on a station installation plan in which an inter-cell interference is taken into account by a communication carrier. In contrast, the small cell base station 300 has a small size to be suitably installed in a desired place (in a room, specifically) by a user. The small cell base station 300 is installed in the large cell MC1 to disperse the traffic of the large cell base station 100 and to cover a dead area in the large cell MC1.

The large cell base station 100 and the small cell base station 300 are connected to a network 500. The network 500 may be a LAN, the Internet, and the like. The network 500 may also be a dedicated network established between the large cell base station 100 and the small cell base station 300.

A downlink (link from the large cell base station 100 to the radio terminal 200, which will be hereinafter referred to as "large cell downlink") frequency band used in communications between the large cell base station 100 and the radio terminal 200 connected with each other may be the same with a downlink (link from the small cell base station 300 to an unillustrated radio terminal, which will be hereinafter referred to as "small cell downlink") frequency band used in communications between the small cell base station 300 and the unillustrated radio terminal connected with each other. In such a case, the radio terminal 200 communicating with the large cell base station is interfered by a radio signal transmitted to the unillustrated radio terminal from the small cell base station 300 through the downlink.

When the radio terminal 200 is interfered by the small cell base station 300 as described above, the large cell base station 100 controls downlink transmission power of the small cell base station 300 so that the interference is reduced.

(1.2) Configuration of Large Cell Base Station

Figure 2:
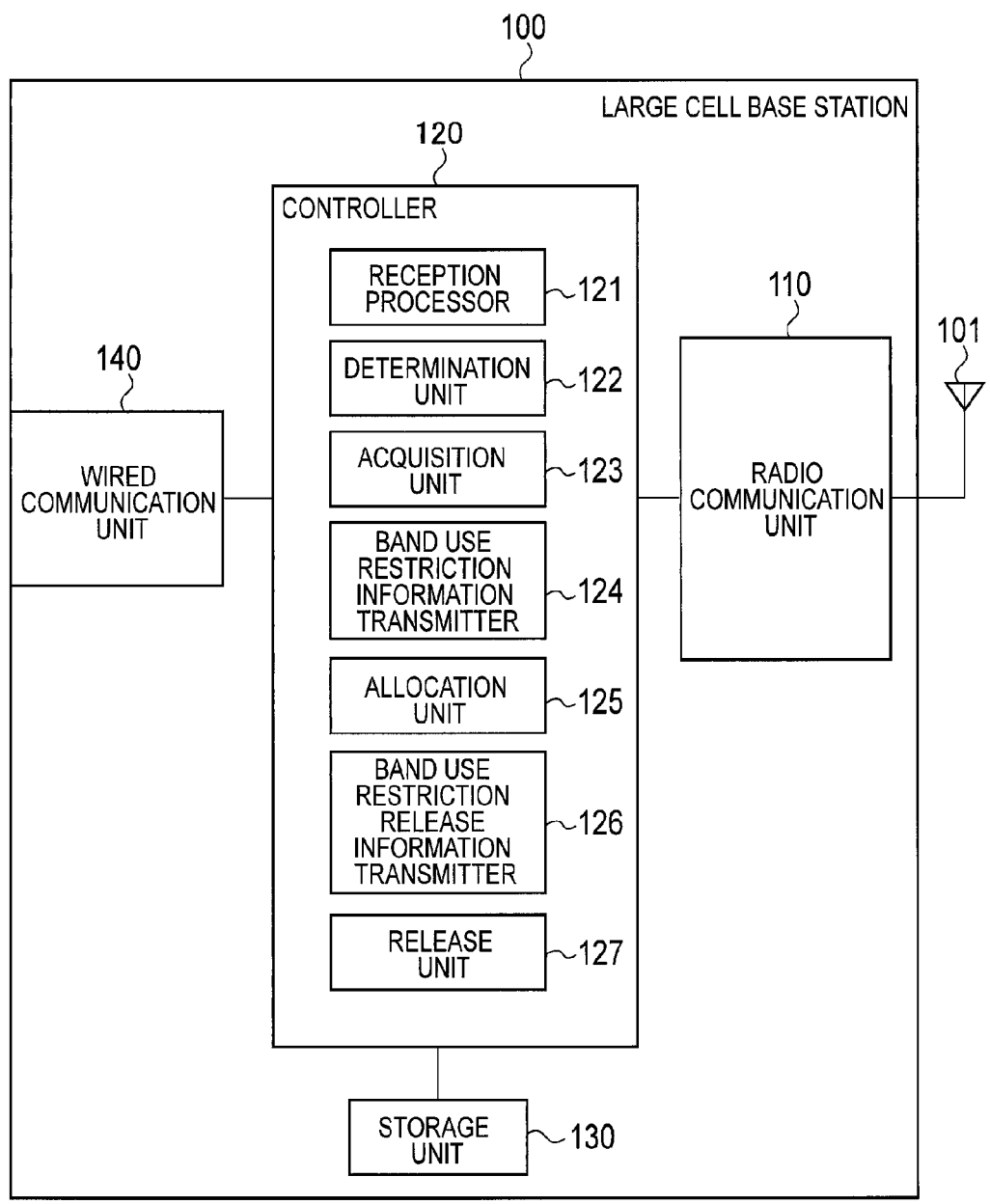
FIG. 2 is a block diagram showing a configuration of a large cell base station according to the embodiment of the present invention.

FIG. 2 is a block diagram showing a configuration of the large cell base station 100. As shown in FIG. 2, the large cell base station 100 employs a PF (Proportional Fair) scheme and includes an antenna unit 101, a radio communication unit 110, a controller 120, a storage unit 130, and a wired communication unit 140.

The radio communication unit 110 includes a radio frequency (RF) circuit, a baseband (BB) circuit, and the like, and transmits and receives a radio signal through the antenna unit 101. In addition, the radio communication unit encodes and modulates a transmission signal and demodulates and decodes a received signal.

The controller 120 is formed of a CPU for example and is configured to control various functions of the large cell base station 100. The storage unit 130 is formed of a memory for example and is configured to store therein various pieces of information used for the control of the large cell base station 100 and the like. The wired communication unit 140 is configured to communicate with an unillustrated other large cell, the small cell base station 300, and the like through the network 500.

The controller 120 includes a reception processor 121, an acquisition unit 123, a determination unit 122, a band use restriction information transmitter 124, an allocation unit 125, a band use restriction release information transmitter 126, and a release unit 127.

The reception processor 121 receives information indicating a communication quality in the radio terminal 200 from the radio terminal 200 through the antenna unit 101 and the radio communication unit 110. Here, the information indicating the communication quality in the radio terminal 200 includes: a Subband-CQI (S-CQI) that is a CQI corresponding to SINR of a subband including six resource blocks; a received electrical field intensity (hereinafter referred to as "RSRP (from small cell base station to large cell terminal)") of a reference signal from the small cell base station 300 in the radio terminal 200; a received electrical field intensity (hereinafter referred to as "RSRP (from large cell base station to large cell terminal)") of a reference signal from the large cell base station 100 to which the radio terminal 200 is connected in the radio terminal 200; and a received electrical field intensity (hereinafter referred to as "RSRP (from other large cell base station to large cell terminal)") of a reference signal from a large cell base station (hereinafter referred to as "other large cell base station") to which the radio terminal 200 is not connected, i.e., a large cell base station other than the large cell base station 100, in the radio terminal 200.

The S-CQI includes information (frequency band identification information) for uniquely identifying a frequency band (S-CQI measurement unit band) of a corresponding subband.

The RSRP (from small cell base station to large cell terminal) is also used as information indicating an amount of interference received by the radio terminal 200 from the small cell base station 300. The RSRP (from small cell base station to large cell terminal) is measured in the radio terminal 200 for each small cell base station 300 that has transmitted the reference signal and includes an ID as identification information of the corresponding small cell base station 300. The RSRP (from other large cell base station to large cell terminal) is measured in the radio terminal 200 for each of the other large cell base stations that have transmitted the reference signal.

Then, on the basis of the received S-CQI, the RSRP (from small cell base station to large cell terminal), the RSRP (from large cell base station to large cell terminal, and the RSRP (from other large cell base station to large cell terminal), the reception processor 121 determines whether the radio terminal 200 that has transmitted the information is receiving interference of a predetermined amount or larger from the small cell base station 300.

Specifically, the reception processor 121 calculates I (large cell terminal) that is an entire amount of interference received by the radio terminal 200. The following first to third methods are used for the calculation of I (large cell terminal).

In the first method, the reception processor 121 calculates the sum of the RSRP (from small cell base station to large cell terminal) and the RSRP (from other large cell base station to large cell terminal).

Then, the reception processor 121 adds a predetermined thermal noise power value to the sum of the RSRP (from small cell base station to large cell terminal) and the RSRP (from other large cell base station to large cell terminal). Thus, I (large cell terminal) is obtained. The thermal noise power value is stored in the storage unit 130. Alternatively, the thermal noise power value is transmitted from the radio terminal 200.

In the second method, the reception processor 121 calculates a SINR (Signal to Interference and Noise Ratio) corresponding to the large cell downlink in the radio terminal 200 on the basis of the S-CQI. Then, the reception processor 121 divides the RSRP (from large cell base station to large cell terminal) by the SINR. Thus, I (large cell terminal) is obtained.

In the third method, the reception processor 121 calculates the SINR (Signal to Interference and Noise Ratio) corresponding to the large cell downlink in the radio terminal 200 on the basis of the S-CQI.

In this process, the controller 120 measures a propagation loss (hereinafter referred to as "uplink propagation loss") in the uplink (link from the radio terminal 200 to the large cell base station 100 that is hereinafter referred to as "large cell uplink") used for communications between the large cell base station 100 and the radio terminal 200 connected to each other. The uplink propagation loss includes a distance attenuation, a shadowing loss, and a feature passing loss.

The reception processor 121 estimates a propagation loss (hereinafter referred to as "downlink propagation loss") PL in the large cell downlink from the uplink propagation loss. For example, the reception processor 121 regards the uplink propagation loss as a downlink propagation loss. Alternatively, the reception processor 121 regards a value obtained by adding a predetermined correction value to the uplink propagation loss as the downlink propagation loss.

Then, the reception processor 121 acquires a transmission power density (hereinafter referred to as "downlink transmission power density") P of the large cell downlink in the large cell base station 100. For example, the downlink transmission power density P is stored in the storage unit 130. The reception processor 121 divides the downlink transmission power density P by the downlink propagation loss PL and further divides the resultant value by the SINR. Thus, I (large cell terminal) is obtained.

After I (large cell terminal) is obtained through any one of the first to the third methods, the reception processor 121 divides the RSRP (from small cell base station to large cell terminal) by I (large cell terminal) to calculate a ratio (hereinafter referred to as "small cell base station interference amount ratio") of the amount of the interference received by the radio terminal 200 from the small base station 300 corresponding to the RSRP (from small cell base station to large cell terminal) to the entire amount of interference received by the radio terminal 200. When the reception processor 121 has received a plurality of RSRPs (from small cell base station to large cell terminal), that is, when the radio terminal 200 is receiving the interference from a plurality of small cell base stations 300, the reception processor 121 divides the RSRP (from small cell base station to large cell terminal) by I (large cell terminal) for each of the RSRPs (from small cell base station to large cell terminal) corresponding to the respective small cell base stations 300. Thus, the reception processor 121 calculates the small cell base station interference amount ratio for each small cell base station 300.

Furthermore, the reception processor 121 determines whether the calculated small cell base station interference amount ratio is equal to or larger than a threshold value α. The threshold value α is a real number (e.g., 0.9) between 0 and 1. The threshold value α is predetermined and is stored in the storage unit 130.

If the small cell base station interference amount ratio is equal to or larger than the threshold value α, the radio terminal 200 is largely affected by the interference from the small cell base station 300. In such a case, the controller 120 ceases resource block allocation based on the PF scheme and performs a control so that the small cell based station 300 does not allocate to another radio terminal connected to the small cell base station 300, a resource block having a frequency band partly or completely overlapping with a frequency band of a resource block to be allocated to the radio terminal 200.

The determination unit 122 determines a resource block to be newly allocated to the radio terminal 200 largely affected by the interference from the small cell base station 300.

The acquisition unit 123 acquires from the large cell base station 100, a transmission delay time of a signal to the small cell base station 300 as a source of the interference received by the radio terminal 200. If there are multiple small cell base stations 300 as the sources of the interference received by the radio terminal 200, the transmission delay time is acquired for each small cell base station 300.

For example, the transmission delay time, e.g., 20 microseconds, is predetermined and is a time, which is estimated from past statistics or the like, by which a signal reaches the small cell base station 300 at the latest. Here, the transmission delay time is stored in the storage unit 130 and the acquisition unit 123 reads out the transmission delay time stored in the storage unit 130.

Alternatively, the transmission delay time is a transmission delay time measured when a network is established in the radio communication system 1. For example, in the LTE, when establishing an X2 connection, the large cell base station 100 transmits "X2 SETUP REQUEST" message, and "X2 SETUP RESPONSE" message as a response to the message is transmitted from the small cell base station 300. Here, ½ of the time between the transmission of the "X2 SETUP REQUEST" message to the transmission of the "X2 SETUP RESPONSE" message is measured as the transmission delay time and stored in the storage unit 130. The acquisition unit 123 reads out the transmission delay time stored in the storage unit 130.

Alternatively, the large cell base station 100 periodically transmits a predetermined signal (e.g., ping when the network 500 is a network employing TCP/IP such as a LAN, the Internet, and the like) to the small cell base station 300 and receives a response signal from the small cell base station 300. The acquisition unit 123 acquires ½ of the time between the transmission of the last signal and the reception of the response signal. The acquired time is the transmission delay time. Moreover, the acquisition unit 123 acquires the change of the transmission delay time on the basis of the reception interval of a message such as an OI (Overload Indicator) periodically transmitted from the small cell base station 300 and corrects the transmission delay time in accordance with the change. Specifically, the transmission delay time is corrected to be longer with a longer message reception interval.

Alternatively, the acquisition unit 123 acquires the transmission delay time on the basis of the change of the S-CQI transmitted from the radio terminal 200 in a case where the use of the frequency band in the small cell base station 300 is restricted. Specifically, when a use restriction is imposed on the frequency band in the small cell base station 300, the S-CQI improves. In such a case, the acquisition unit 123 acquires a time between the transmission of band use restriction information described later by the large cell base station 100 and the improving of the S-CQI. The acquired time is the transmission delay time. Here, the acquired transmission delay time is stored in the storage unit 130 and is used for releasing the use restriction of the frequency band in the small cell base station 300 and for restricting the use of the frequency band thereafter.

When the small cell base station interference amount ratio is equal to or larger than the threshold vale α, the band use restriction information transmitter 124 generates the band use restriction information instructing the use restriction of the frequency band. The band use restriction information includes information on the frequency band (use restricted band) under restriction of use.

Specifically, the band use restriction information transmitter 124 acquires a frequency band (allocated band) for the resource block determined by the determination unit 122. Next, the band use restriction information transmitter 124 acquires an S-CQI for which an S-CQI measurement unit band includes the entire allocated band from the S-CQIs received by the reception processor 121. The information on the S-CQI measurement unit band is included in the S-CQI received by the reception processor 121.

Furthermore, the band use restriction information transmitter 124 generates band use restriction information indicating that the S-CQI measurement unit band for the acquired S-CQI is the use restricted band.

The allocated region is a tentative allocated region for the large cell base station 100 to determine the use restricted band, and is not necessarily a band that is actually allocated to the radio terminal 200 by the large cell base station 100 after restricting the use of the frequency band in the small cell base station 300.

FIG. 3 is a diagram showing a relationship between the S-CQI measurement unit band and the use restricted band in each of a conventional case and the embodiment. In the conventional case, the use restricted band matches the allocated band but does not match the S-CQI measurement unit band as shown in FIG. 3(a). In this case, the S-CQI measurement unit band includes a band where the interference is received and a band where the interference is not received, and the S-CQI is lower than in a case of covering only the band where the interference is not received. Thus, even when only the resource block at the frequency band under the restriction of use is allocated to the radio terminal, the corresponding S-CQI is lower than an original CQI for the frequency band under the restriction of use. Thus, the modulation scheme is degraded more than necessary, and degradation of the transmission efficiency and furthermore, degradation of the use efficiency of the resource block may occur.

In contrast, in the embodiment, the S-CQI covering the entire allocated band is acquired from the S-CQI measurement unit bands for the S-CQIs from the radio terminal 200. The entire acquired S-CQI measurement unit band serves as the use restricted band, and an upper limit and a lower limit of the use restricted band match boundaries of the S-CQI measurement unit band, as shown in FIG. 3(b). Thus, the use of the entire S-CQI measurement unit band is restricted. Accordingly, the CQI is even across the entire S-CQI measurement unit band and thus matches the S-CQI. Accordingly, when the resource block at the use restricted band is allocated to the radio terminal 200, the CQI of the allocated frequency band is not estimated to be lower than the original one. Therefore, the modulation scheme is not degraded more than necessary to reduce the use efficiency of the resource block as in the conventional case.

When the S-CQI measurement unit band changes, the band use restriction information transmitter 124 acquires the S-CQI for which the S-CQI measurement unit band includes the entire allocated band from the S-CQIs received by the reception processor 121 on the basis of the change. Then, the band use restriction information transmitter 124 generates the band use restriction information indicating that the S-CQI measurement unit band for the acquired S-CQI is the use restricted band. Thus, the use restricted band can follow the change of the S-CQI measurement unit band.

Furthermore, the band use restriction information transmitter 124 transmits an RNTP message including the generated band use restriction information to the small cell base station 300 through the wired communication unit 140 and the network 500. Here, the destination is one or more small cell base stations 300 corresponding to the RSRP (from small cell base station to large cell terminal) used for calculating the small cell base station interference amount ratio equal to or higher than the threshold value a among the small cell base station interference amount ratios.

When receiving the RNTP message including the band use restriction information, the small cell base station 300 restricts the allocation of the resource block at the frequency band included in the band use restriction information to the other radio terminals. If the resource block at the frequency band included in the band use restriction information has already been allocated, the small cell base station 300 releases the resource block.

The allocation unit 125 determines whether a time equivalent to the transmission delay time has elapsed after the transmission of the RNTP message including the band use restriction information by the band use restriction information transmitter 124. When the band use restriction information transmitter 124 has transmitted the RNTP message including the band use restriction information to a plurality of small cell base stations 300, the allocation unit 125 determines whether the time equivalent to the longest transmission delay time among the transmission delay times respectively for the small cell base stations 300 as the destinations has elapsed.

After the time equivalent to the transmission delay time has elapsed after the transmission of the RNTP message including the band use restriction information by the band use restriction information transmitter 124, the allocation unit 125 allocates the resource block determined by the determination unit 122 to the radio terminal 200 largely affected by the interference from the small cell base station 300. The allocation unit 125 may perform the following operation in consideration of a processing time for restricting the allocation of the resource block at the frequency band included in the band use restriction information to the other radio terminal after the reception of the RNTP message including the band use restriction information by the small cell base station 300. Specifically, the allocation unit 125 may allocate the resource block determined by the determination unit 122 to the radio terminal 200 largely affected by the interference from the small cell base station 300 after a time equivalent to a time obtained by adding the processing time for the allocation restriction in the small cell base station 300 to the transmission delay time after the transmission of the RNTP message including the band use restriction information. In such a case, the processing time for the allocation restriction in the small cell base station 300 is predetermined and stored in the storage unit 130.

The band use restriction release information transmitter 126 determines whether a resource block release timing has arrived that is a predetermined timing after the allocation unit 125 has allocated the resource block to the radio terminal 200. The resource block release timing is a timing arriving when a predetermined time elapses after the allocation unit 125 has allocated the resource block to the radio terminal 200 for example.

When the resource block release timing has arrived, the band use restriction release information transmitter 126 generates the band use restriction release information instructing the release of the use restriction of the frequency band for the resource block determined by the determination unit 122. The band use restriction release information includes information on the frequency band of which the use restriction is to be released.

Furthermore, the band use restriction release information transmitter 126 transmits the RNTP message including the generated band use restriction release information to the small cell base station 300 through the wired communication unit 140 and the network 500. Here, the destination is the same small cell base station 300 as the destination of the RNTP message including the band use restriction information transmitted by the band use restriction information transmitter 124.

The release unit 127 releases the resource block allocated to the radio terminal 200 by the allocation unit 125 before the time equivalent to the transmission delay time elapses after the transmission of the RNTP message including the band use restriction release information by the band use restriction release information transmitter 126. Here, if the band use restriction release information transmitter 126 has transmitted the RNTP message including the band use restriction release information to a plurality of small cell base stations 300, the release unit 127 performs the following operation. Specifically, the release unit 127 releases the resource block allocated to the radio terminal 200 by the allocation unit 125 before a lapse of the time equivalent to the shortest transmission delay time among the transmission delay times respectively for the small cell base stations 300 as the destinations. Then, the controller 120 resumes the resource block allocation based on the PF scheme.

When receiving the RNTP message including the band use restriction release information, the small cell base station 300 releases the allocation restriction of the resource block at the frequency band included in the band use restriction release information.

(2) Operation of Radio Communication System

Next, the operation of the radio communication system 1 will be described.

Figure 4:
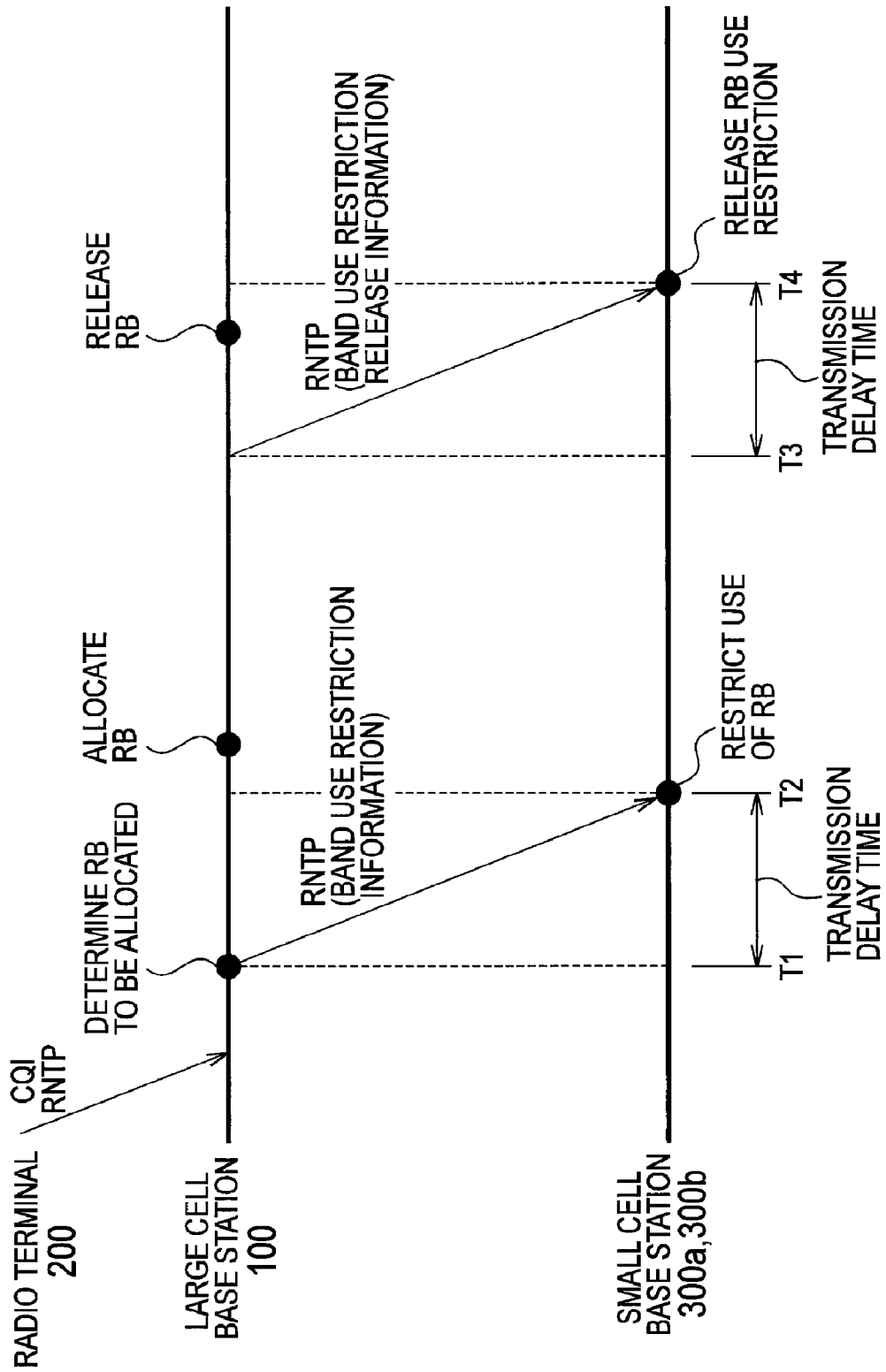
FIG. 4 is a time chart showing an operation of the radio communication system according to the embodiment of the present invention.

FIG. 4 is a time chart showing the operation of the radio communication system 1. As shown in FIG. 4, the large cell base station 100 receives from the radio terminal connected to the large cell base station 100, the S-CQI, the RSRP (from small cell base station to large cell terminal), the RSRP (from large cell base station to large cell terminal), and the RSRP (from other large cell base station to large cell terminal).

Thereafter, the large cell base station 100 determines the resource block to be allocated to the radio terminal 200 and transmits to the small cell base station 300, the RNTP message including the band use restriction information in which the upper limit and the lower limit of the use restricted band match the boundaries of the S-CQI measurement unit band.

The small cell base station 300 receives the RNTP message including the band use restriction information after the time equivalent to the transmission delay time (T2−T1) has elapsed after the large cell base station 100 has transmitted the RNTP message including the band use restriction information to the small cell base station 300. Then, the small cell base station 300 restricts the use of a predetermined resource block in accordance with the band use restriction information.

Meanwhile, the large cell base station 100 allocates the determined resource block to the radio terminal 200 after the time equivalent to the transmission delay time (T2−T1) has elapsed after the RNTP message including the band use restriction information is transmitted.

Then, when the resource block release timing arrives, the large cell base station 100 transmits the RNTP message including the band use restriction release information to the small cell base station 300. Furthermore, the large cell base station 100 releases the resource block allocated to the radio terminal 200 before the time equivalent to the transmission delay time (T4−T3) elapses after the RNTP message including the band use restriction release information is transmitted to the small cell base station 300.

Meanwhile, the small cell base station 300 receives the RNTP message including the band use restriction release information when the time equivalent to the transmission delay time (T4−T3) has elapsed after the large cell base station 100 has transmitted the RNTP message including the band use restriction release information. Thereafter, the small cell base station 300 releases the use restriction of the resource block under the restriction of use in accordance with the band use restriction release information.

Next, operations of the large cell base station 100 will be described.

Figure 5:
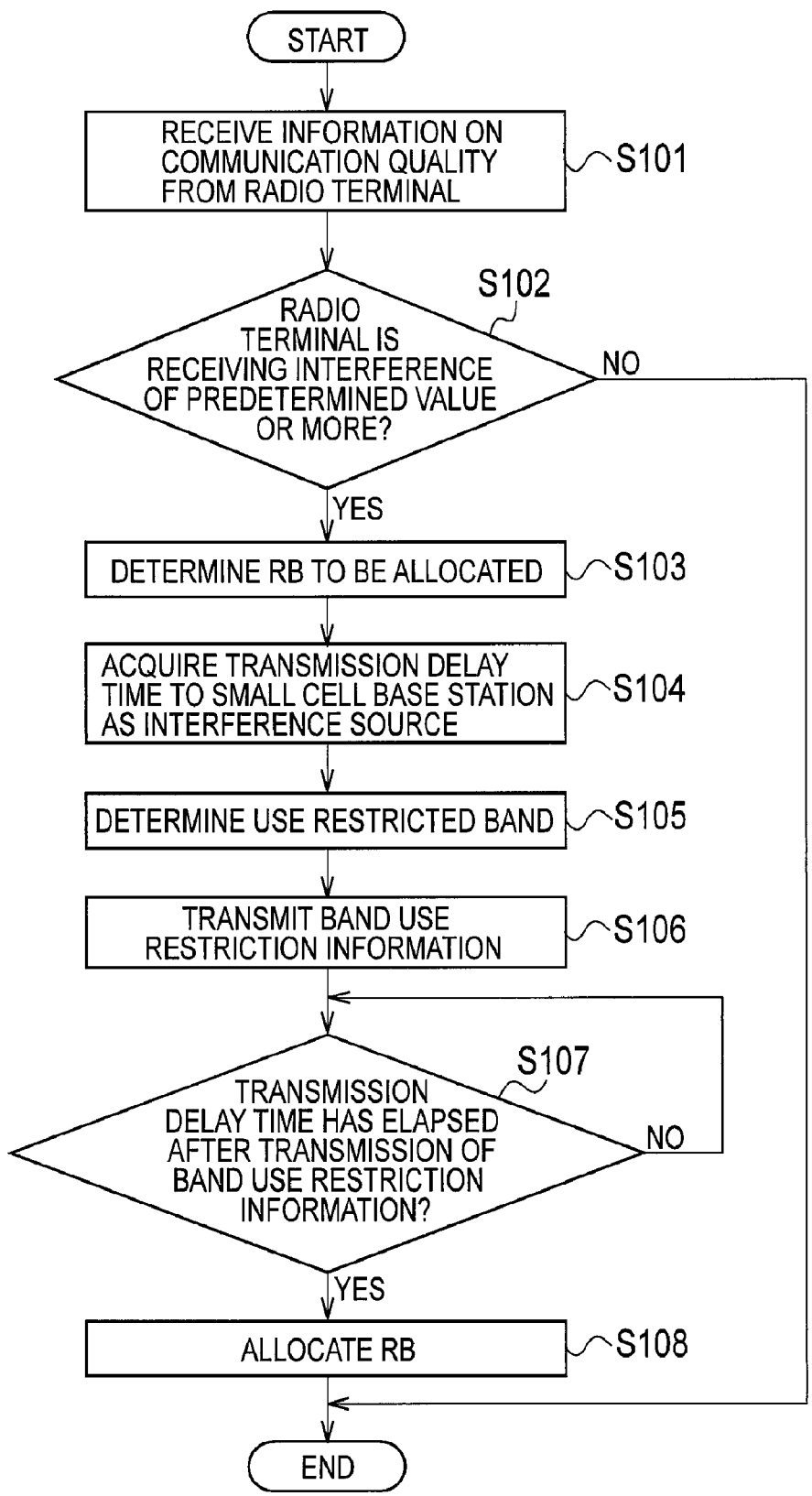
FIG. 5 is a flowchart showing a first operation of the large cell base station according to the embodiment of the present invention.

FIG. 5 is a flowchart showing a first operation of the large cell base station 100. In Step S101, the controller 120 of the large cell base station 100 receives the S-CQI, the RSRP (from small cell base station to large cell terminal), the RSRP (from large cell base station to large cell terminal), and the RSRP (from other large cell base station to large cell terminal) which are information indicating the communication quality in the radio terminal 200.

In Step S102, the controller 120 determines whether the radio terminal 200 is receiving the interference of a predetermined value or larger from the small cell base station 300. Specifically, the controller 120 determines whether the ratio of the amount of interference received by the radio terminal 200 from the small cell base station 300 corresponding to the RSRP (from small cell base station to large cell terminal) to the entire amount of the interference received by the radio terminal 200 is equal to or larger than the threshold value α.

When the radio terminal 200 is receiving the interference of the value equal to or larger than the predetermined value from the small cell base station 300, the series of operations is terminated. When the radio terminal 200 is receiving the interference of the amount equal to or larger than the predetermined value from the small cell base station 300, in Step S103, the controller 120 determines a resource block to be newly allocated to the radio terminal 200.

In Step S104, the controller 120 acquires the transmission delay time of the signal transmitted to the small cell base station 300 as the source of the interference received by the radio terminal 200.

In Step S105, the controller 120 determines the use restricted band in such a manner as to make the upper and lower limits of the use restricted band match the boundaries of the S-CQI measurement unit band received in Step S101. Furthermore, in Step S106, the controller 120 transmits the RNTP message including the generated band use restriction information to the small cell base station 300.

In Step S107, the controller 120 determines whether the time equivalent to the transmission delay time has elapsed after the controller 120 has transmitted the RNTP message including the band use restriction information. When the time equivalent to the transmission delay time elapses after the RNTP message including the band use restriction information is transmitted, in Step S108, the controller 120 allocates the resource block determined in Step S103 to the radio terminal 200.

Figure 6:
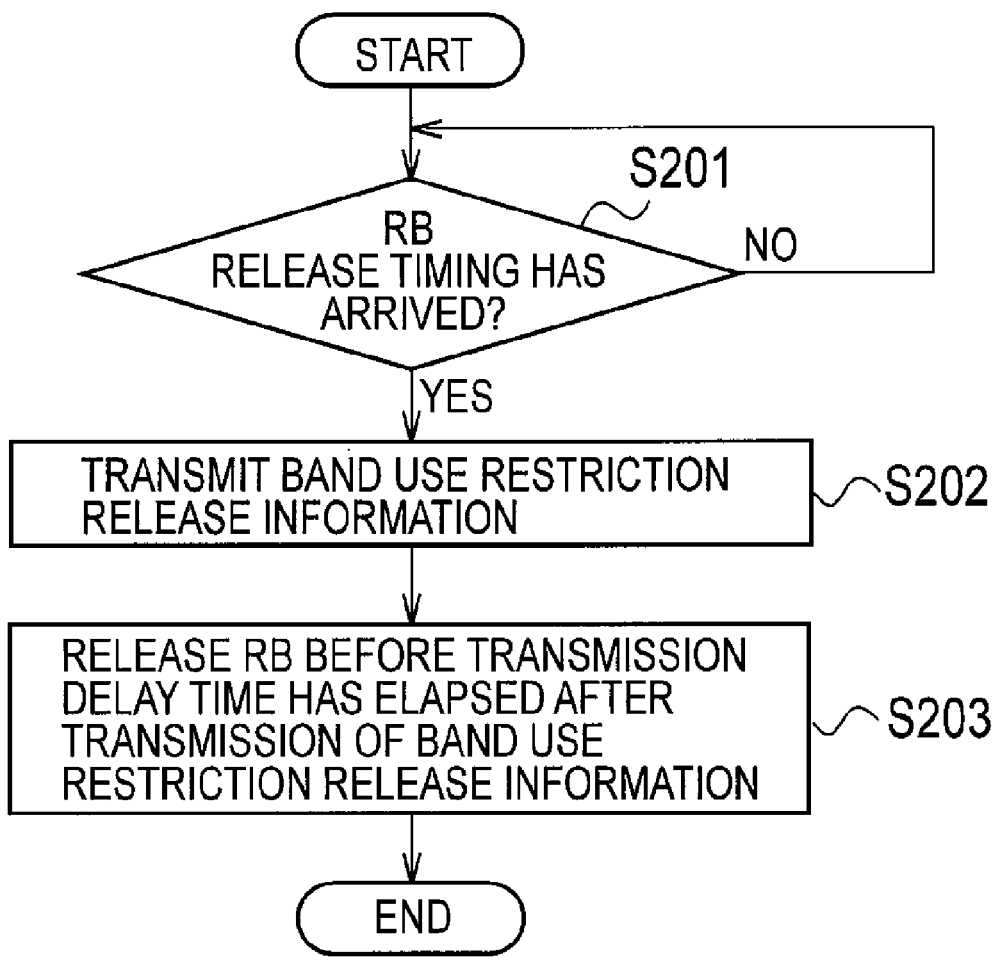
FIG. 6 is a flowchart showing a second operation of the large cell base station according to the embodiment of the present invention.

FIG. 6 is a flowchart of a second operation of the large cell base station 100.

In Step S201, the controller 120 in the large cell base station 100 determines whether the resource block release timing has arrived. When the resource block release timing has arrived, in Step S202, the controller 120 generates the band use restriction release information instructing the release of the use restriction of the frequency band equivalent to the resource block determined in Step S104 of FIG. 5. The controller 120 then transmits the RNTP message including the generated band use restriction release information to the small cell base station 300.

In Step S203, the controller 120 releases the resource block allocated to the radio terminal 200 in Step S107 before the time equivalent to the transmission delay time elapses after the RNTP message including the band use restriction release information is transmitted.

(3) Advantageous Effect

In the radio communication system 1 of the embodiment, the large cell base station 100 transmits the band use restriction information indicating the use restricted band that is a frequency band needing the restriction of use by the small cell base station 300 when the radio terminal 200 is receiving interference from the small cell base station 300. In this case, the large cell base station 100 sets the upper limit and the lower limit of the use restricted band to match the boundaries of the S-CQI measurement unit band including the entire allocated band. Thus, the use of the entire S-CQI measurement unit band is restricted. Accordingly, the CQI is even across the entire S-CQI measurement unit band and thus matches the S-CQI. Accordingly, when the resource block at the use restricted band is allocated to the radio terminal 200, the CQI of the allocated frequency band is not estimated to be lower than the original one. Therefore, the modulation scheme is not degraded more than necessary to reduce the use efficiency of the resource block as in the conventional case.

(4) Other Embodiment

The details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, the band use restriction information transmitter 124 acquires the S-CQI for which the S-CQI measurement unit band includes the entire allocated band from the S-CQIs received by the reception processor 121. Alternatively, an S-CQI measurement unit region including an S-CQI measurement unit band that overlaps with the allocated band may be acquired. In such a case, the band use restriction information transmitter 124 generates the band use restriction information indicating that the one or more S-CQI measurement unit bands for one or more S-CQIs thus acquired are the use restricted bands.

In the above-described embodiment, the case is described in which the large cell base station 100 is a macrocell base station that forms a macrocell, and the small cell base station 300 is a femtocell base station that forms a femtocell. The present invention is not limited to the embodiment and it is sufficient if the small cell formed by the small cell base station 300 is smaller than the large cell formed by the large cell base station 100. For example, when the large cell base station 100 is the macrocell base station that forms the macrocell, the small cell base station 300 may be a base station that forms a microcell or a picocell. When the large cell base station 100 is the microcell base station that forms the microcell, the small cell base station 300 may be a base station that forms a picocell or a femtocell. When the large cell base station 100 is the picocell base station that forms the picocell, the small cell base station 300 may be a base station that forms the femto.

In the above-described embodiment, the large cell base station 100 employs the PF scheme. However, the present invention can be similarly applied to a case where the round robin scheme is employed.

In the above-described embodiment, the radio communication system 1 has a configuration based on the LTE Release 9 or the LTE-Advanced. However, the radio communication system 1 may have a configuration based on other communication standards.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2009-249466 (filed on Oct. 29, 2009) is incorporated herein by reference.

INDUSTRIAL APPLICABILITY

The radio communication system, the large cell base station, and the communication control method of the present invention can appropriately reduce interference from the small cell base station to the radio terminal connected to the large cell base station while preventing the degradation of the use efficiency of the radio resource, and thus are useful as a radio communication system and the like.

The invention claimed is:

1. A large cell base station to which a radio terminal is connected, the large cell base station configured to form a large cell in which a small cell base station configured to form a small cell smaller than the large cell is installed, comprising:
   a determination unit configured to determine a radio resource to be allocated to the radio terminal, the radio resource determined by the determination unit having a frequency band narrower than a measurement unit band that is a frequency band for a measurement unit of a communication quality in the radio terminal; and
   a band use restriction information transmitter configured to, when the radio terminal is receiving interference from the small cell base station, select the measurement unit band including the frequency band of the radio resource determined by the determination unit from the measurement unit bands, and transmit band use restriction information indicating that the selected measurement unit band is a use restricted band that is a frequency band needing restriction of use by the small cell base station to the small cell base station.

2. The large cell base station according to claim 1, wherein the band use restriction information transmitter changes the use restricted band when the measurement unit band changes.

3. A communication control method in a large cell base station to which a radio terminal is connected, the large cell base station configured to form a large cell in which a small cell base station configured to form a small cell smaller than the large cell is installed, comprising the steps of:
   determining, at the large cell base station, a radio resource to be allocated to the radio terminal, the determined radio resource having a frequency band narrower than a measurement unit band that is a frequency band for a measurement unit of a communication quality in the radio terminal; and
   when the radio terminal is receiving interference from the small cell base station, selecting, at the large cell radio base station, the measurement unit band including the frequency band of the radio resource determined by the determination unit from the measurement unit bands, and transmitting band use restriction information indicating that the selected measurement unit band is a use restricted band that is a frequency band needing restriction of use by the small cell base station to the small cell base station.

* * * * *